(12) United States Patent
Choi et al.

(10) Patent No.: US 11,550,143 B2
(45) Date of Patent: Jan. 10, 2023

(54) PROJECTOR

(71) Applicant: SAMSUNG ELECTRONICS CO., LTD., Suwon-si (KR)

(72) Inventors: Jeongseok Choi, Suwon-si (KR); Myungho Kim, Suwon-si (KR); Chanyul Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 199 days.

(21) Appl. No.: 17/131,234

(22) Filed: Dec. 22, 2020

(65) Prior Publication Data

US 2021/0199949 A1 Jul. 1, 2021

(30) Foreign Application Priority Data

Dec. 27, 2019 (KR) .................... 10-2019-0177083

(51) Int. Cl.
*G02B 26/00* (2006.01)
*G02B 5/20* (2006.01)
*G03B 21/20* (2006.01)

(52) U.S. Cl.
CPC .......... *G02B 26/007* (2013.01); *G02B 5/201* (2013.01); *G03B 21/2033* (2013.01)

(58) Field of Classification Search
CPC ... G02B 26/007; G02B 5/201; G03B 21/2033
USPC .......................................................... 353/84
See application file for complete search history.

(56) References Cited

U.S. PATENT DOCUMENTS

| 6,467,909 B2 | 10/2002 | Inoue et al. |
| 6,661,578 B2 | 12/2003 | Hedrick |
| 9,544,555 B2 | 1/2017 | Hirata et al. |
| 9,860,499 B2 | 1/2018 | Mizoguchi |
| 10,032,757 B2 | 7/2018 | Zhang et al. |
| 10,281,812 B2 | 5/2019 | Shin et al. |
| 2011/0242392 A1 | 10/2011 | Chiang |
| 2018/0231771 A1 | 8/2018 | Schuck, III et al. |

(Continued)

FOREIGN PATENT DOCUMENTS

| JP | 08152614 A | 6/1996 |
| JP | 2000-171898 A | 6/2000 |
| JP | 2011512547 A | 4/2011 |

(Continued)

OTHER PUBLICATIONS

International Search Report (PCT/ISA/210) and Written Opinion (PCT/ISA/237) dated Apr. 19, 2021 issued by the International Searching Authority in International Application No. PCT/KR2020/018628.

*Primary Examiner* — Jerry L Brooks
(74) *Attorney, Agent, or Firm* — Sughrue Mion, PLLC

(57) ABSTRACT

A projector includes a monochromatic self-luminous display panel; a color filter disposed in front of the monochromatic self-luminous display panel; a filter driver configured to move the color filter in direction parallel to the monochromatic self-luminous display panel; a micro lens array disposed in front of or behind the color filter and configured to convert light emitted from the monochromatic self-luminous display panel into parallel light; a projection lens disposed in front of the micro lens array and the color filter and configured to project light that has passed through the micro lens array and the color filter onto a screen; and a processor configured to control the monochromatic self-luminous display panel and the filter driver.

20 Claims, 32 Drawing Sheets

(56) References Cited

U.S. PATENT DOCUMENTS

2019/0080138 A1  3/2019  Gao et al.
2019/0270403 A1  9/2019  Sobecki et al.

FOREIGN PATENT DOCUMENTS

| KR | 100705108 B1 | 4/2007 |
| KR | 10-0741134 B1 | 7/2007 |
| KR | 10-2011-0111088 A | 10/2011 |
| KR | 101791605 B1 | 10/2017 |
| KR | 1020180118480 A | 10/2018 |
| WO | 2009091610 A1 | 7/2009 |

PROJECTOR

CROSS-REFERENCE TO RELATED APPLICATION(S)

This application is based on and claims priority under 35 U.S.C. § 119 to Korean Patent Application No. 10-2019-0177083, filed on Dec. 27, 2019, in the Korean Intellectual Property Office, the disclosure of which is incorporated by reference herein in its entirety.

BACKGROUND

1. Field

The disclosure relates to a projector, and, more particularly, to a projector using a self-luminous display panel.

2. Description of Related Art

Projectors that enlarge and project an image on a wall or screen are widely used.

Examples of the projectors include a liquid crystal display (LCD) projector using three LCDs and a digital light processing (DLP) projector using digital micromirror devices (DMDs).

The LCD projector uses a separate light source to project an image because the liquid crystal display cannot emit light by itself. In addition, the LCD projector uses three transmission type LCDs, three dichroic mirrors, and a dichroic prism to represent color images. Accordingly, the LCD projector has a problem in that the structure is complex, the size is large, and the luminous efficiency (lm/W) is low.

The DLP projector also uses a separate light source to project an image because the DMD cannot emit light by itself. In addition, the DLP projector uses DMDs and a color filter wheel to represent color images. However, the DLP projector has a problem in that the price of the projector is high because the DMD is expensive.

SUMMARY

Provided is a projector capable of projecting a color image by using a self-luminous micro light emitting diode (LED) display panel and a color filter.

Additional aspects will be set forth in part in the description which follows and, in part, will be apparent from the description, or may be learned by practice of the presented embodiments.

According to an aspect of the disclosure, there is provided a projector including monochromatic self-luminous display panel; a color filter disposed in front of the monochromatic self-luminous display panel; a filter driver configured to move the color filter in a direction parallel to the monochromatic self-luminous display panel; a micro lens array disposed in front of or behind the color filter and configured to convert light emitted from the monochromatic self-luminous display panel into parallel light; a projection lens disposed in front of the micro lens array and the color filter and configured to project light that has passed through the micro lens array and the color filter onto a screen; and a processor configured to control the monochromatic self-luminous display panel and the filter driver.

The monochromatic self-luminous display panel includes a plurality of micro LEDs.

Each of the plurality of micro LEDs has a square cross-section or a circular cross-section, and the plurality of micro LEDs are spaced apart at predetermined intervals, based on the plurality of micro LEDs having the square cross-section, a distance between adjacent micro LEDs of the plurality of micro LEDs is greater than a length of one side of each of the plurality of micro LEDs, and, based on the plurality of micro LEDs having the circular cross-section, the distance between the adjacent micro LEDs of the plurality of micro LEDs is greater than a diameter of each of the plurality of micro LEDs.

The color filter includes a plurality of filter cells arranged in a checkerboard pattern, each of the plurality of filter cells includes four filters arranged in a 2×2 matrix, and the four filters include a red filter R, a green filter G, a blue filter B, and a green filter G arranged in this order in a clockwise direction.

The plurality of filter cells respectively correspond to the plurality of micro LEDs in a one-to-one relationship.

The processor is further configured to control the filter driver to move the color filter to circulate the four filters of each of the plurality of filter cells that correspond to each of the plurality of micro LEDs along one path with respect to each of the plurality of micro LEDs, respectively.

The processor is further configured to move the color filter to circulate the four filters of each of the plurality of filter cells in an order of the red filter R, the green filter G, the blue filter B, and the green filter G.

The filter driver is further configured to move the color filter in an up-and-down direction and in a left-and-right direction.

The filter driver includes: an up-and-down filter driver configured to move the color filter in the up-and-down direction; and a left-and-right filter driver configured to move the color filter in the left-and-right direction.

Each of the up-and-down filter driver and the left-and-right filter driver includes: a piezo actuator configured to move the color filter in one direction; and a coupler configured to selectively connect or separate the color filter and the piezo actuator.

The color filter includes a plurality of red filters R, a plurality of blue filters B, and a plurality of green filters G, the plurality of red filters R and the plurality of blue filters B are alternately disposed at a plurality of intersection points where a plurality of virtual vertical lines and a plurality of virtual horizontal lines arranged at predetermined intervals intersect, and the plurality of green filters G are disposed at centers of a plurality of squares, respectively, that are formed by the plurality of virtual vertical lines and the plurality of virtual horizontal lines.

Two red filters R of the plurality of red filters R and two blue filters B of the plurality of blue filters B are circumscribed to one green filter G of the plurality of green filters G.

A sum of a number of the plurality of red filters R and a number of the plurality of blue filters B is equal to a number of the plurality of micro LEDs.

The processor is further configured to control the filter driver to reciprocate the color filter by a predetermined distance in a diagonal direction of the monochromatic self-luminous display panel.

The filter driver is configured to reciprocate the color filter by the predetermined distance between a center of a red filter R, among the plurality of red filters R, and a center of a green filter G, among the plurality of green filters G, that are disposed diagonally adjacent to each other.

The processor is further configured to control to output a red light by moving the color filter to a first position at which the plurality of red filters R are positioned above first micro LEDs and the plurality of blue filters B are positioned above second micro LEDs, among the plurality of micro LEDs, and turning on the first micro LEDs corresponding to the plurality of red filters R while the second micro LEDs are off.

The processor is further configured to control to output a blue light by turning off the first micro LEDs corresponding to the plurality of red filters R, and turning on the second micro LEDs corresponding to the plurality of blue filters B while maintaining the first position of the color filter.

The processor is further configured to control to output a green light by moving the color filter to a second position at which the plurality of green filters G are positioned above all of the plurality of micro LEDs, and turning on all of the plurality of micro LEDs.

The filter driver includes a piezo actuator configured to reciprocate the color filter in the diagonal direction of the monochromatic self-luminous display panel.

Each of the plurality of micro LEDs has a circular cross-section and are spaced apart at predetermined intervals, and a distance between adjacent micro LEDs of the plurality of micro LEDs is smaller than a diameter of each of the plurality of micro LEDs.

Based on the micro lens array being disposed behind the color filter, the projection lens is disposed directly in front of the color filter, and based on the micro lens array being disposed in front of the color filter, the projection lens is disposed directly in front of the micro lens array.

The plurality of red filters R, the plurality of blue filters B, and the plurality of green filters G are circular filters.

The processor is further configured to: control to output a red light and a blue light by placing the color filter at a first position at which the plurality of red filters R and the plurality of blue filters B are positioned above the plurality of micro LEDs and turning on the plurality of micro LEDs, and control to output a green light by moving the color filter to a second position at which the plurality of green filters G are positioned above the plurality of micro LEDs, and turning on the plurality of micro LEDs.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, certain embodiments of a projector will be described in detail with reference to the accompanying drawings.

However, it is to be understood that technologies mentioned herein are not limited to specific embodiments, but include various modifications, equivalents, and/or alternatives according to embodiments. The matters defined herein, such as a detailed construction and elements thereof, are provided to assist in a comprehensive understanding of embodiments. Thus, it is apparent that embodiments may be carried out without those defined matters. Also, well-known functions or constructions are omitted to provide a clear and concise description of embodiments. Further, dimensions of various elements in the accompanying drawings may be arbitrarily increased or decreased for assisting in a comprehensive understanding.

As used herein, the terms such as "1st" or "first," "2nd" or "second," etc., may modify corresponding components regardless of importance or order and are used to distinguish one component from another without limiting the components. For example, a first component may be referred to as a second component, and similarly, a second component may also be referred to as a first component.

The terms herein may be construed as commonly known to those skilled in the art unless otherwise defined.

Further, the terms 'leading end', 'rear end', 'upper side', 'lower side', 'top end', 'bottom end', etc. used herein are defined with reference to the drawings. However, the shape and position of each component are not limited by the terms.

Figure 1:
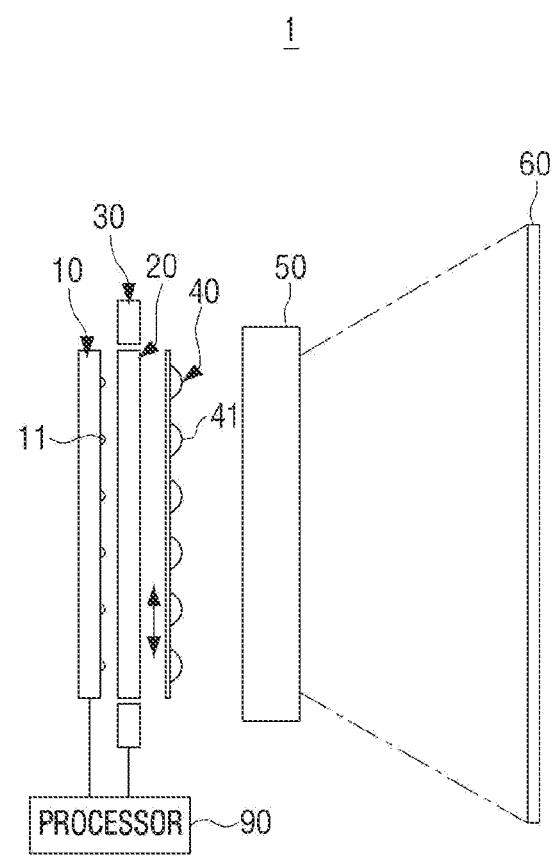
FIG. 1 is a view conceptually illustrating a projector according to an embodiment.

FIG. 1 is a view conceptually illustrating a projector according to an embodiment.

Referring to FIG. 1, a projector 1 according to an embodiment may include a monochromatic self-luminous display panel 10, a color filter 20, a filter driver 30, a micro lens array 40, a projection lens 50, and a processor 90.

The monochromatic self-luminous display panel 10 may be configured to display an image in one color. In an embodiment, the monochromatic self-luminous display panel 10 may be implemented with a plurality of micro LEDs 11 capable of emitting one color of light. For example, the monochromatic self-luminous display panel 10 may be implemented with a plurality of micro LEDs 11 capable of emitting white light.

The monochromatic self-luminous display panel 10 may include a plurality of micro LEDs 11 and a printed circuit board 12 (see FIG. 3) on which the plurality of micro LEDs 11 are disposed.

The plurality of micro LEDs 11 may be configured to emit white light, and disposed on one surface of the printed circuit board 12 at predetermined intervals. Each of the plurality of micro LEDs 11 may be formed to have a circular cross-section or a square cross-section.

The printed circuit board 12 may be provided with a circuit to supply power to the plurality of micro LEDs 11 and to individually turn on and off the plurality of micro LEDs 11.

In an embodiment, a case in which the monochromatic self-luminous display panel 10 is implemented with the plurality of micro LEDs 11 is described as an example, but the monochromatic self-luminous display panel 10 is not limited thereto. The monochromatic self-luminous display panel 10 may be implemented with various self-luminous devices such as a plurality of organic light emitting diodes, a plurality of quantum dot light emitting diodes, and the like.

The color filter 20 may be formed to make an image output from the monochromatic self-luminous display panel 10 into a full color image, and may include a plurality of red filters, a plurality of blue filters, and a plurality of green filters.

The color filter 20 may be disposed in front of the monochromatic self-luminous display panel 10 and may be formed to correspond to the size and shape of the monochromatic self-luminous display panel 10. For example, when the monochromatic self-luminous display panel 10 is formed in a rectangular shape, the color filter 20 is also formed in a rectangular shape having a size corresponding to the monochromatic self-luminous display panel 10. The color filter 20 will be described in detail below.

The filter driver 30 may be formed to move the color filter 20 in parallel with respect to the monochromatic self-luminous display panel 10. The filter driver 30 may be formed to move the color filter 20 in an up-and-down direction and in a left-and-right direction. Here, the up-and-down direction refers to a direction in which the color filter 20 ascend and descend with respect to the monochromatic self-luminous display panel 10 in FIG. 1 (arrow direction), and the left-and-right direction refers to a direction perpendicular to the paper of FIG. 1.

Hereinafter, the filter driver 30 will be described in detail with reference to FIGS. 2 and 3.

Figure 2:
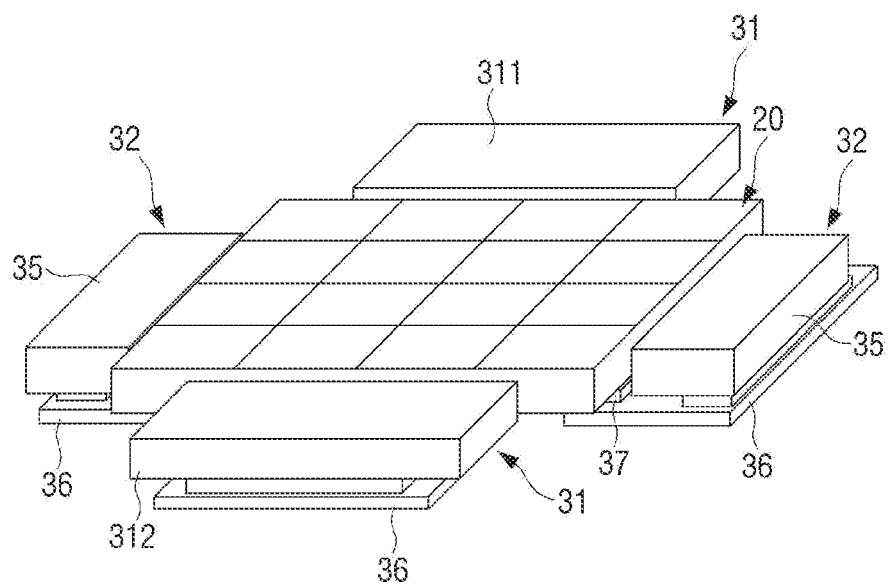
FIG. 2 is a perspective view illustrating a filter driver used in a projector according to an embodiment.

FIG. 2 is a perspective view illustrating a filter driver used in a projector according to an embodiment. FIG. 3 is a cross-sectional view illustrating a filter driver used in a projector according to an embodiment.

Referring to FIG. 2, the filter driver 30 may include an up-and-down filter driver 31 formed to move the color filter 20 in the up-and-down direction, and a left-and-right filter driver 32 formed to move the color filter 20 in the left-and-right direction.

The up-and-down filter driver 31 and the left-and-right filter driver 32 may be formed to independently drive the color filter 20. In detail, when the up-and-down filter driver 31 moves the color filter 20 up and down, the left-and-right filter driver 32 does not interfere with the up and down movement of the color filter 20. In addition, when the left-and-right filter driver 32 moves the color filter 20 left and right, the up-and-down filter driver 31 does not interfere with the left and right movement of the color filter 20.

The up-and-down filter driver 31 may include an upper driver 311 disposed on the upper side of the color filter 20 and a lower driver 312 disposed on the lower side of the color filter 20. The upper driver 311 and the lower driver 312 may be formed to linearly move the color filter 20 up and down. Accordingly, the color filter 20 may be moved upward and downward by the upper driver 311 and the lower driver 312. The upper driver 311 and the lower driver 312 may have the same structure.

Figure 3:
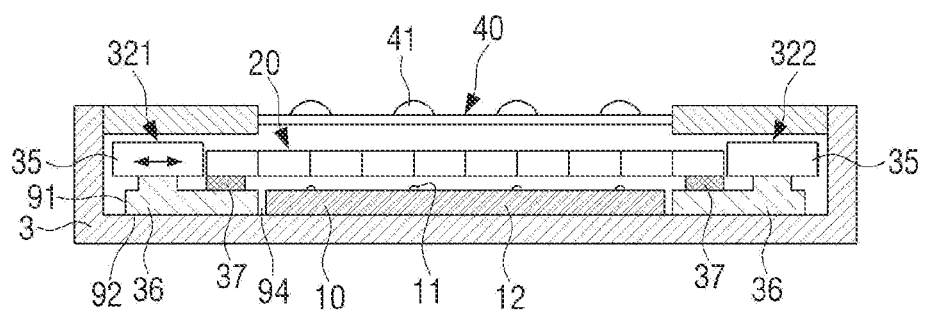
FIG. 3 is a cross-sectional view illustrating a filter driver used in a projector according to an embodiment.

With continuing reference to FIG. 2 and further reference to FIG. 3, the left-and-right filter driver 32 may include a left driver 321 disposed on the left side of the color filter 20 and a right driver 322 disposed on the right side of the color filter 20. The left driver 321 and the right driver 322 may be formed to linearly move the color filter 20 left and right. Accordingly, the color filter 20 may be moved the left and right by the left driver 321 and the right driver 322. The left driver 321 and the right driver 322 may have the same structure.

In addition, the left driver 321 and the right driver 322 may have the same structure as the upper driver 311 and the lower driver 312. In other words, the left driver 321, the right driver 322, the upper driver 311, and the lower driver 312 may have the same structure.

The up-and-down filter driver 31 and the left-and-right filter driver 32 may include a piezo actuator 35 and a coupler 36. The piezo actuator 35 may generate a driving force capable of linearly moving the color filter 20.

The coupler 36 may be formed to selectively connect the color filter 20 and the piezo actuator 35, so that the driving force of the piezo actuator 35 is selectively transmitted to the color filter 20. For example, when the piezo actuator 35 and the color filter 20 are connected to each other by the coupler 36, the color filter 20 may be moved in the up-and-down direction or in the left-and-right direction by the piezo actuator 35. However, when the coupler 36 does not connect the piezo actuator 35 and the color filter 20, the piezo actuator 35 does not move the color filter 20.

Hereinafter, the up-and-down filter driver 31 and the left-and-right filter driver 32 will be described in detail with reference to FIG. 3.

The up-and-down filter driver 31 are formed in the same structure as the left-and-right filter driver 32; therefore, only the left-and-right filter driver 32 will be described below.

Referring to FIG. 3, the left-and-right filter driver 32 may be disposed inside a housing 3 and include the left driver 321 and the right driver 322.

The housing 3 may be provided to support and fix the monochromatic self-luminous display panel 10, the filter driver 30, and the micro lens array 40. In detail, the monochromatic self-luminous display panel 10 is disposed on the lower surface of the housing 3. The left driver 321 and the right driver 322 of the left-and-right filter driver 32 are provided on the left and right sides of the monochromatic self-luminous display panel 10. The color filter 20 is disposed above the monochromatic self-luminous display panel 10.

The left driver 321 is disposed on the left side of the color filter 20 and is formed to linearly move the color filter 20 left and right. The right driver 322 is disposed on the right side of the color filter 20 and is formed to linearly move the color filter 20 left and right. Because the left driver 321 and the right driver 322 have the same structure, only the left driver 321 will be described below.

The left driver 321 may include a piezo actuator 35 and a coupler 36. The coupler 36 may be implemented as an electromagnet. One end 91 of the coupler 36 may be fixed to the piezo actuator 35. The bottom surface of the coupler 36 may be provided to slide with respect to the inner surface 92 of the housing 3. Accordingly, when the piezo actuator 35 is operated, the coupler 36 may slide integrally with the piezo actuator 35 along the inner surface 92.

The other end 94 of the coupler 36 may be formed to be selectively coupled to a connecting member 37 provided at the left edge of the color filter 20. The connecting member 37 may be formed of a magnetic material that may be selectively coupled with an electromagnet. For example, the connecting member 37 may be formed of iron (Fe).

Accordingly, when power is applied to the coupler 36, that is, the electromagnet to generate magnetic force, the connecting member 37 fixed to the color filter 20 is coupled to the coupler 36. When the coupler 36 and the connecting member 37 are coupled to each other by magnetic force, the color filter 20 moves integrally with the coupler 36. Accordingly, when the piezo actuator 35 is operated, the color filter 20 coupled with the coupler 36 may linearly move left and right.

However, when power is not applied to the coupler 36, the connecting member 37 of the color filter 20 is not coupled to the coupler 36. Therefore, even when the piezo actuator 35 is operated, the color filter 20 does not move.

For example, the connecting member 37 of the color filter 20 may be formed to slide with respect to the other end 94 of the coupler 36. For example, when power is not applied to the coupler 36, the connecting member 37 of the color filter 20 may be formed to move linearly in the up-and-down direction with respect to the other end 94 of the coupler 36.

The micro lens array 40 may convert light emitted from the monochromatic self-luminous display panel 10 into parallel light, and may include a plurality of micro lenses 41.

As illustrated in FIGS. 1 and 3, the micro lens array 40 is disposed in front of or above the color filter 20. The micro lens array 40 may be fixed to the front surface of the housing 3.

The plurality of micro lenses 41 constituting the micro lens array 40 may be provided to correspond in one-to-one relationship with the plurality of micro LEDs 11 of the monochromatic self-luminous display panel 10.

The projection lens 50 may be disposed in front of the micro lens array 40 and may be formed to project light that has passed through the micro lens array 40 onto a screen 60. The projection lens 50 and the screen 60 are the same as or similar to the projection lens and the screen used in a related art projector, detail descriptions thereof are omitted.

The processor 90 may control the monochromatic self-luminous display panel 10 and the filter driver 30 to project a full-color image onto the screen 60. The processor 90 may be configured to control on and off each of the plurality of micro lenses 41 of the monochromatic self-luminous display panel 10.

In addition, the processor 90 may be configured to control the filter driver 30 to move the color filter 20 in the up-and-down direction and in the left-and-right direction with respect to the monochromatic self-luminous display panel 10. In detail, the processor 90 may control the up-and-down filter driver 31 so that the color filter 20 is linearly moved in the up-and-down direction. In addition, the processor 90 may control the left-and-right filter driver 32 so that the color filter 20 is linearly moved in the left-and-right direction.

The processor 90 may be configured to include, for example, a processing circuit such as an electronic circuit board, various electronic components such as application specific integrated circuit (ASIC), read-only memory (ROM), random access memory (RAM), and the like, and/or program modules.

In the projector 1 illustrated in FIGS. 1 and 3, the micro lens array 40 is disposed in front of the color filter 20. However, the micro lens array 40 may be disposed behind the color filter 20. Hereinafter, a projector 1 in which the micro lens array 40 is disposed behind the color filter 20 will be described with reference to FIGS. 4 and 5.

Figure 4:
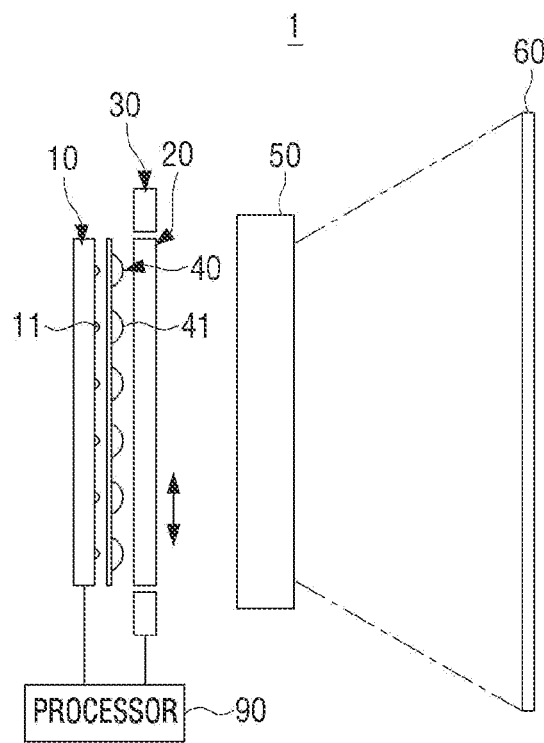
FIG. 4 is a view conceptually illustrating a projector according to another embodiment.
Figure 5:
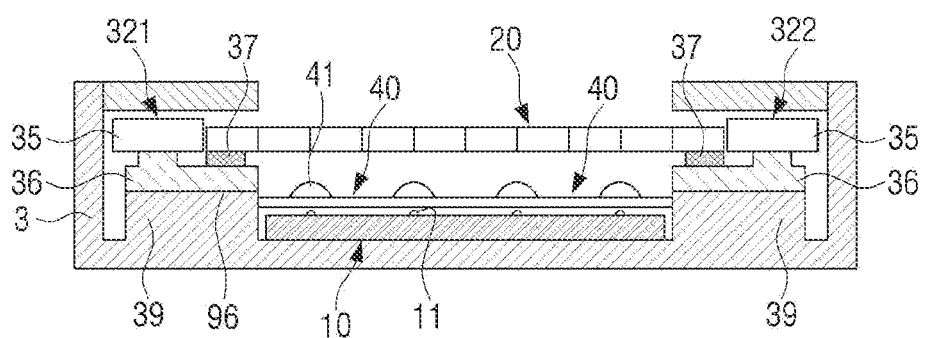
FIG. 5 is a cross-sectional view illustrating a filter driver used in a projector according to another embodiment.

FIG. 4 is a view conceptually illustrating a projector according to another embodiment. FIG. 5 is a cross-sectional view illustrating a filter driver used in a projector according to another embodiment.

Referring to FIGS. 4 and 5, a projector 1 according to an embodiment may include a monochromatic self-luminous display panel 10, a color filter 20, a filter driver 30, a micro lens array 40, a projection lens 50, and a processor 90.

The monochromatic self-luminous display panel 10, the color filter 20, the filter driver 30, the projection lens 50, and the processor 90 may be the same as those of the projector 1 according to the above-described embodiment; therefore, detailed descriptions thereof are omitted.

The micro lens array 40 may be disposed in front of the monochromatic self-luminous display panel 10 behind the color filter 20. In other words, the micro lens array 40 may be disposed between the color filter 20 and the monochromatic self-luminous display panel 10. The micro lens array 40 may be fixed to a support portion 39 protruding from the lower portion of a housing 3.

The micro lens array 40 may be configured to convert light emitted from the monochromatic self-luminous display panel 10 into parallel light, and may include a plurality of micro lenses 41. The plurality of micro lenses 41 of the micro lens array 40 may be provided to correspond in one-to-one relationship with the plurality of micro LEDs 11 of the monochromatic self-luminous display panel 10.

The support portion 39 may protrude from the lower surface of the housing 3, and may be formed to support the filter driver 30. The support portion 39 may be formed around the monochromatic self-luminous display panel 10 and the micro lens array 40. The filter driver 30 may be disposed on the upper surface 96 of the support portion 39.

Hereinafter, a monochromatic self-luminous display panel used in a projector according to an embodiment will be described in detail with reference to FIGS. 6 and 7.

Figure 6:
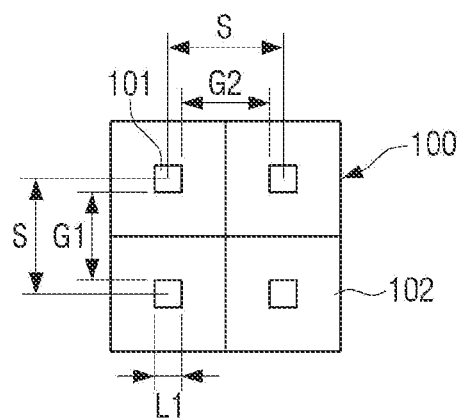
FIG. 6 is a view illustrating an example of a monochromatic self-luminous display panel used in a projector according to an embodiment.

FIG. 6 is a view illustrating an example of a monochromatic self-luminous display panel used in a projector according to an embodiment.

Referring to FIG. 6, a monochromatic self-luminous display panel 100 may include a printed circuit board 102 and a plurality of micro LEDs 101. The monochromatic self-luminous display panel 100 may correspond to the monochromatic self-luminous display panel 10, the printed circuit board 102 may correspond to the printed circuit board 12, and the plurality of micro LEDs 101 may correspond to the plurality of micro LEDs 11.

The plurality of micro LEDs 101 may be formed to have a square cross-section and to emit white light. The plurality of micro LEDs 101 may be disposed on one surface of the printed circuit board 102 and spaced apart at predetermined intervals. The plurality of micro LEDs 101 may be provided so that a distance G1 between two micro LEDs 101 adjacent in the up-and-down direction and a distance G2 between two micro LEDs 101 adjacent in the left-and-right direction are the same (G1=G2). The distances G1 and G2 between the two adjacent micro LEDs 101 may be formed larger than the length L1 of the one side of the micro LED 101.

FIG. 6 shows a case where four micro LEDs 101 are arranged in a 2×2 matrix shape on the printed circuit board 102 for convenience of illustration and description; however, the arrangement and number of the micro LEDs 101 are not limited thereto. Accordingly, six or more micro LEDs 101 may be disposed in various arrangement on the printed circuit board 102.

The printed circuit board 102 may be provided with a circuit capable of supplying power to the plurality of micro LEDs 101 and controlling the on/off of each of the plurality of micro LEDs 101.

Figure 7:
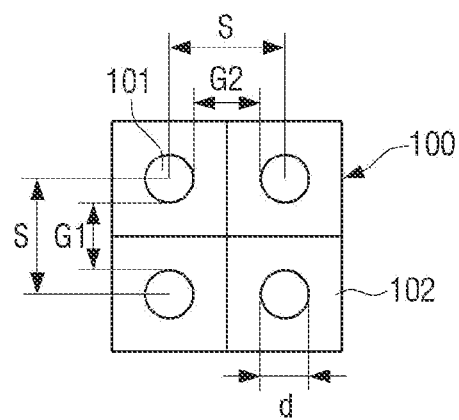
FIG. 7 is a view illustrating an example of a monochromatic self-luminous display panel used in a projector according to an embodiment.

FIG. 7 is a view illustrating an example of a monochromatic self-luminous display panel used in a projector according to an embodiment.

Referring to FIG. 7, a monochromatic self-luminous display panel 100 may include a printed circuit board 102 and a plurality of micro LEDs 101.

Each of the plurality of micro LEDs 101 may be formed to have a circular cross-section and to emit white light. The plurality of micro LEDs 101 may be disposed on one surface of the printed circuit board 102 and spaced apart at predetermined intervals. The plurality of micro LEDs 101 may be provided so that a distance G1 between two micro LEDs 101 adjacent in the up-and-down direction and a distance G2 between two micro LEDs 101 adjacent in the left-and-right direction are the same (G1=G2). The distances G1 and G2 between the two adjacent micro LEDs 101 may be formed larger than the diameter d of the micro LED 101.

FIG. 7 shows a case where four micro LEDs 101 are arranged in a 2×2 matrix shape on the printed circuit board 102 for convenience of illustration and description; however, the arrangement and number of the micro LEDs 101 are not limited thereto.

The printed circuit board 102 may be provided with a circuit capable of supplying power to the plurality of micro LEDs 101 and controlling the on/off of each of the plurality of micro LEDs 101.

Hereinafter, a color filter 20 that may be used in the monochromatic self-luminous display panel 100 will be described in detail with reference to FIG. 8.

Figure 8:
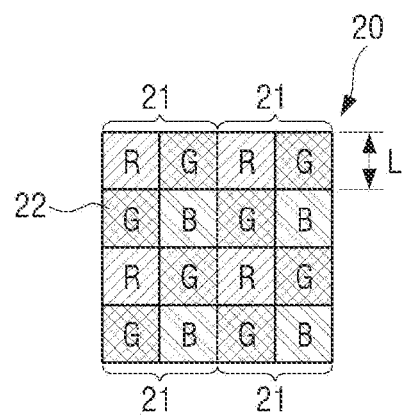
FIG. 8 is a view illustrating an example of a color filter used in a projector according to an embodiment.

FIG. 8 is a view illustrating an example of a color filter used in a projector according to an embodiment.

Referring to FIG. 8, the color filter 20 may include a plurality of filters 22 arranged in a checkerboard pattern. The plurality of filters 22 may include a plurality of red filters R, a plurality of blue filters B, and a plurality of green filters G.

The color filter 20 may include a plurality of filter cells 21. Each of the plurality of filter cells 21 may include four filters 22 arranged in a 2×2 matrix shape, and the four filters 22 may include one red filter R, one blue filter B, and two green filters G. Each of the four filters 22 may be formed in a square shape. The length L of each side of the filter 22 may be determined to be ½ of the distance S (see FIGS. 6 and 7) between the centers of the two adjacent micro LEDs 101. In addition, the area of each of the four filters 22 may be formed to be larger than the cross-sectional area of each of the micro LEDs 101.

The four filters 22 may have a 2×2 matrix shape, and may be arranged in the order of a red filter R, a green filter G, a blue filter B, and a green filter G in a clockwise direction. In other words, the filter cell 21 may have a square shape, and may be arranged such that the red filter R and the blue filter B face each other in a diagonal direction, and two green filters G face each other in another diagonal direction.

The color filter 20 may include the same number of filter cells 21 as the number of the plurality of micro LEDs 101 of the monochromatic self-luminous display panel 10. In other words, the plurality of filter cells 21 of the color filter 20 and the plurality of micro LEDs 101 of the monochromatic self-luminous display panel 10 may correspond in one-to-one relationship.

The color filter 20 illustrated in FIG. 8 includes four filter cells 21, that is, a first filter cell, a second filter cell, a third filter cell, and a fourth filter cell, and each of the four filter cells 21 includes a red filter R, a green filter G, a blue filter B, and a green filter G. Accordingly, the color filter 20 as illustrated in FIG. 8 may be used in the monochromatic self-luminous display panel 100 including four micro LEDs 101.

Hereinafter, a method of forming a full color by controlling the monochromatic self-luminous display panel 100 and the color filter 20 having the above-described structures by the processor 90 will be described in detail with reference to FIGS. 9A to 9D and FIGS. 10A to 10D.

FIGS. 9A, 9B, 9C, and 9D are views for illustrating a method of generating full colors when the color filter of FIG. 8 is used in the monochromatic self-luminous display panel of FIG. 6.

The processor 90 may control the filter driver 30 so that the color filter 20 having the checkerboard pattern as illustrated in FIG. 8 circulates in one direction with respect to the plurality of micro LEDs 101 of the monochromatic self-luminous display panel 100. In detail, the processor 90 may controls the filter driver 30 so that the four filters 22 of each of the plurality of filter cells 21 forming the color filter 20, that is, the red filter R, the green filter G, the blue filter B, and the green filter G circulate in one direction with respect to the corresponding one micro LED 101.

Figure 9A:
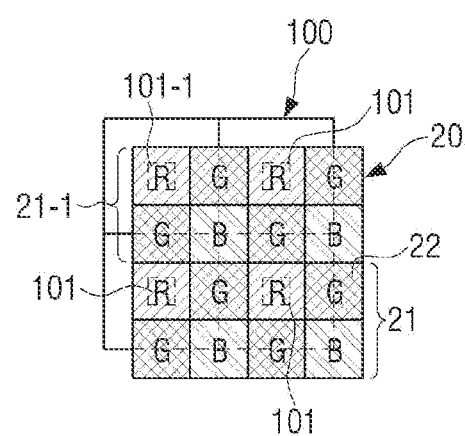
FIGS. 9A, 9B, 9C, and 9D are views for illustrating a method of generating full colors.

For example, the color filter 20 may be positioned as illustrated in FIG. 9A. In detail, the red filter R of the first filter cell 21-1 may be positioned above the corresponding micro LED 101, e.g., a first micro LED 101-1. The red filters R of the other three filter cells 21 may be also positioned above the corresponding micro LEDs 101, respectively. Each of the micro LEDs 101 of the monochromatic self-luminous display panel 100 may have a square cross-section and have a cross-sectional area smaller than the area of each of the plurality of filters 22.

In this state, when the processor 90 turns on the four micro LEDs 101, white light emitted from the four micro LEDs 101 passes through the red filters R of the color filter 20 and becomes red light, so that the red light is emitted from the color filter 20.

Figure 9B:
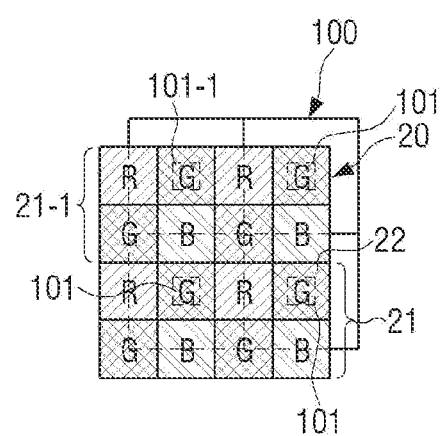

Next, the processor 90 controls the filter driver 30 to move the color filter 20 to the left by a predetermined distance, so that the green filters G are positioned above the micro LEDs 101 as illustrated in FIG. 9B.

For example, the processor 90 controls the filter driver 30 to move the color filter 20 to the left of the monochromatic self-luminous display panel 100 by a distance corresponding to ½ of the distance S between the centers of two adjacent micro LEDs 101. Then, all green filters G are positioned above the four micro LEDs 101. Accordingly, the white light emitted from the four micro LEDs 101 passes through the green filters G and becomes green light, so that the green light is emitted from the color filter 20.

Figure 9C:
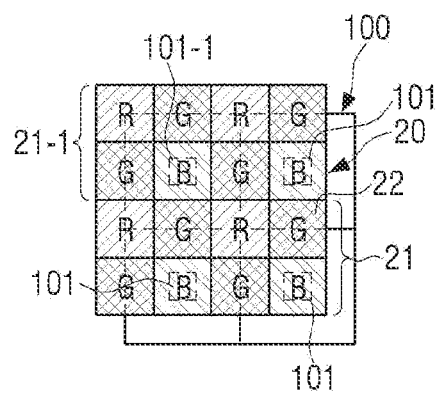

Subsequently, the processor 90 controls the filter driver 30 to move the color filter 20 upward by a predetermined distance, so that the blue filters B are positioned above the micro LEDs 101 as illustrated in FIG. 9C.

For example, the processor 90 controls the filter driver 30 to move the color filter 20 to the upper side of the monochromatic self-luminous display panel 100 by a distance corresponding to ½ of the distance S between the centers of two adjacent micro LEDs 101. Then, all blue filters B are positioned above the four micro LEDs 101. Accordingly, the white light emitted from the four micro LEDs 101 passes through the blue filters B and becomes blue light, so that the blue light is emitted from the color filter 20.

Figure 9D:
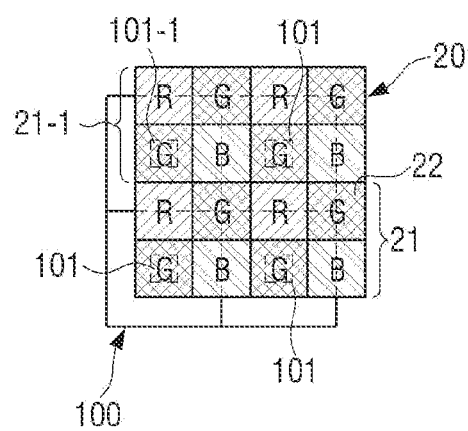

Next, the processor 90 controls the filter driver 30 to move the color filter 20 to the right by a predetermined distance, so that the green filters G are positioned above the micro LEDs 101 as illustrated in FIG. 9D.

For example, the processor 90 controls the filter driver 30 to move the color filter 20 to the right of the monochromatic self-luminous display panel 100 by a distance corresponding to ½ of the distance S between the centers of two adjacent micro LEDs 101. Then, all green filters G are positioned above the four micro LEDs 101. Accordingly, the white light emitted from the four micro LEDs 101 passes through the green filters G and becomes green light, so that the green light is emitted from the color filter 20.

Subsequently, the processor 90 controls the filter driver 30 to move the color filter 20 downward by a predetermined distance, so that the red filters R are positioned above the micro LEDs 101 as illustrated in FIG. 9A.

For example, the processor 90 controls the filter driver 30 to move the color filter 20 to the lower side of the monochromatic self-luminous display panel 100 by a distance corresponding to ½ of the distance S between the centers of two adjacent micro LEDs 101. Then, all red filters R are positioned above the four micro LEDs 101. Accordingly, the white light emitted from the four micro LEDs 101 passes through the red filters R and becomes red light, so that the red light is emitted from the color filter 20.

As described above, the processor 90 may control the filter driver 30 to continuously move the color filter 20 at a predetermined speed with respect to the monochromatic self-luminous display panel 100 in the above-described direction, that is, in the order of the red filter R, the green filter G, the blue filter B, and the green filter G.

As described above, when the processor 90 controls the filter driver 30 to move the color filter 20 so that the four filters 22 of each of the plurality of filter cells 21 of the color filter 20 corresponding to each of the plurality of micro LEDs 101 are circulated in one direction with respect to the corresponding micro LED 101, an image emitted from the monochromatic self-luminous display panel 100 may be made into a full color image.

FIGS. 10A, 10B, 10C, and 10D are views for illustrating a method of generating full colors in a projector 1 using the color filter 20 of FIG. 8 in the monochromatic self-luminous display panel 100 of FIG. 7.

The processor 90 may control the filter driver 30 so that the color filter 20 having the checkerboard pattern as illustrated in FIG. 8 is circulated in one direction with respect to the plurality of micro LEDs 101 of the monochromatic self-luminous display panel 100. In detail, the processor 90 may control the filter driver 30 so that the four filters 22 of each of the plurality of filter cells 21 forming the color filter 20, that is, the red filter R, the green filter G, the blue filter B, and the green filter G are circulated in one direction with respect to the corresponding one micro LED 101.

Figure 10A:
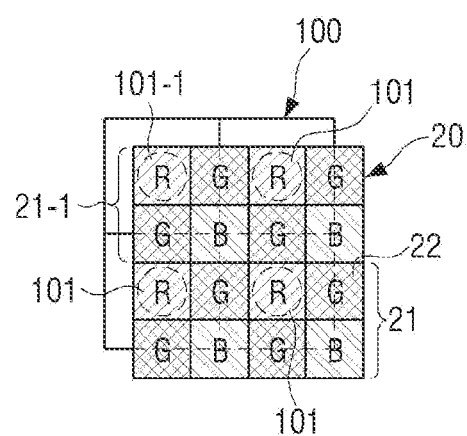
FIGS. 10A, 10B, 10C, and 10D are views for illustrating a method of generating full colors.

For example, the color filter 20 may be positioned as illustrated in FIG. 10A. In detail, the red filter R of each of the four filter cells 21 may be positioned above the corresponding micro LED 101. For example, each of the micro LEDs 101 of the monochromatic self-luminous display panel 100 may have a circular cross-section, and the diameter d of the micro LED 101 is smaller than the vertical and horizontal distances G1 and G2 between two adjacent micro LEDs 101 (see FIG. 7).

In this state, when the processor 90 turns on the four micro LEDs 101, white light emitted from the four micro LEDs 101 passes through the red filters R of the color filter 20 and becomes red light, so that the red light is emitted from the color filter 20.

Figure 10B:
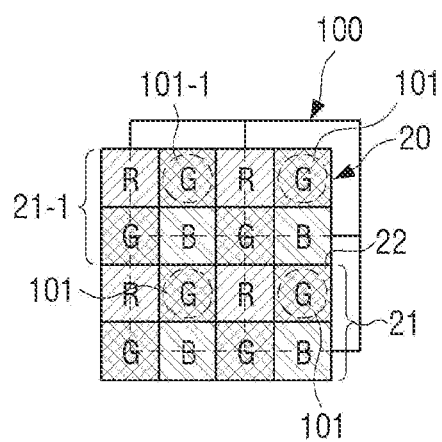

Next, the processor 90 controls the filter driver 30 to move the color filter 20 to the left by a predetermined distance, so that the green filters G are positioned above the micro LEDs 101 as illustrated in FIG. 10B.

For example, the processor 90 controls the filter driver 30 to move the color filter 20 to the left of the monochromatic self-luminous display panel 100 by a distance corresponding to ½ of the distance S between the centers of two adjacent micro LEDs 101. Then, all green filters G are positioned above the four micro LEDs 101. Accordingly, the white light emitted from the four micro LEDs 101 passes through the green filters G and becomes green light, so that the green light is emitted from the color filter 20.

Figure 10C:
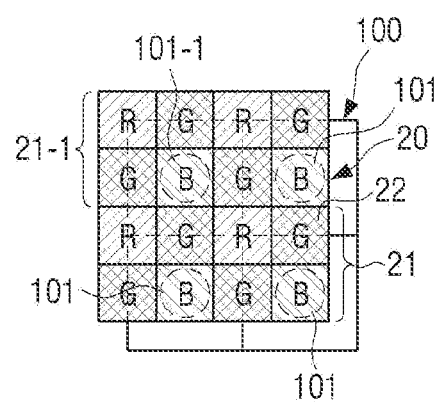

Subsequently, the processor 90 controls the filter driver 30 to move the color filter 20 upward by a predetermined distance, so that the blue filters B are positioned above the micro LEDs 101 as illustrated in FIG. 10C.

For example, the processor 90 controls the filter driver 30 to move the color filter 20 to the upper side of the monochromatic self-luminous display panel 100 by a distance corresponding to ½ of the distance S between the centers of two adjacent micro LEDs 101. Then, all blue filters B are positioned above the four micro LEDs 101. Accordingly, the white light emitted from the four micro LEDs 101 passes through the blue filters B and becomes blue light, so that the blue light is emitted from the color filter 20.

Figure 10D:
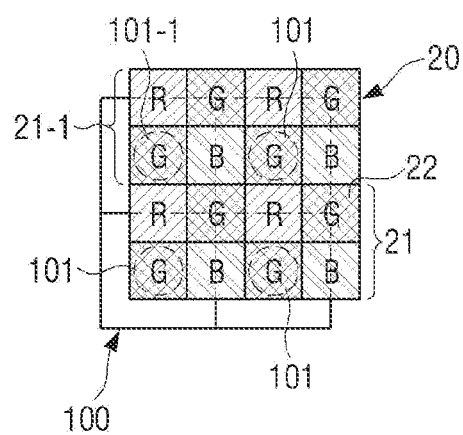

Next, the processor 90 controls the filter driver 30 to move the color filter 20 to the right by a predetermined distance, so that the green filters G are positioned above the micro LEDs 101 as illustrated in FIG. 10D.

For example, the processor 90 controls the filter driver 30 to move the color filter 20 to the right of the monochromatic self-luminous display panel 100 by a distance corresponding to ½ of the distance S between the centers of two adjacent micro LEDs 101. Then, all green filters G are positioned above the four micro LEDs 101. Accordingly, the white light emitted from the four micro LEDs 101 passes through the green filters G and becomes green light, so that the green light is emitted from the color filter 20.

Subsequently, the processor 90 controls the filter driver 30 to move the color filter 20 downward by a predetermined distance, so that the red filters R are positioned above the micro LEDs 101 as illustrated in FIG. 10A.

For example, the processor 90 controls the filter driver 30 to move the color filter 20 to the lower side of the monochromatic self-luminous display panel 100 by a distance corresponding to ½ of the distance S between the centers of two adjacent micro LEDs 101. Then, all red filters R are positioned above the four micro LEDs 101. Accordingly, the white light emitted from the four micro LEDs 101 passes through the red filters R and becomes red light, so that the red light is emitted from the color filter 20.

As described above, the processor 90 may control the filter driver 30 to continuously move the color filter 20 at a predetermined speed with respect to the monochromatic self-luminous display panel 100 in the above-described direction, that is, in the order of the red filter R, the green filter G, the blue filter B, and the green filter G.

As described above, when the processor 90 controls the filter driver 30 to move the color filter 20 so that the four filters 22 of each of the plurality of filter cells 21 of the color filter 20 corresponding to each of the plurality of micro LEDs 101 are circulated in one direction with respect to the corresponding micro LED 101, an image emitted from the monochromatic self-luminous display panel 100 may be made into a full color image.

Hereinafter, an example of a color filter that may be used in a projector according to an embodiment will be described in detail with reference to FIG. 11.

Figure 11:
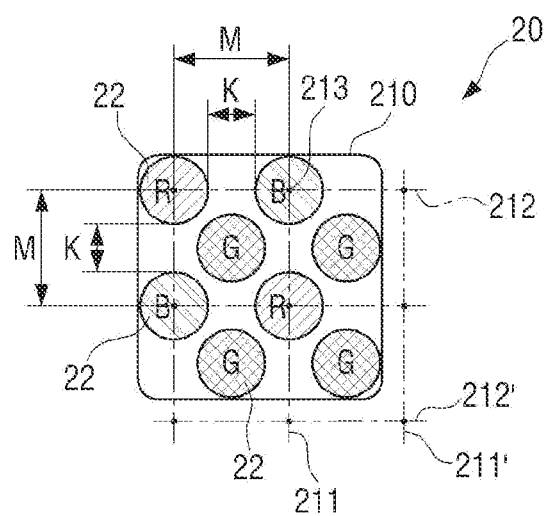
FIG. 11 is a view illustrating an example of a color filter used in a projector according to an embodiment.

FIG. 11 is a view illustrating an example of a color filter used in a projector according to an embodiment.

Referring to FIG. 11, a color filter 20 may include a plurality of filters 22 and a filter plate 210 supporting the plurality of filters 22.

The plurality of filters 22 may include a plurality of circular red filters R, a plurality of circular blue filters B, and a plurality of circular green filters G. The plurality of circular red filters R, the plurality of circular blue filters B, and the plurality of circular green filters G may be disposed on the filter plate 210. Although the circular filters are shown and described, this is not limiting and the filters may be rectangular.

The filter plate 210 may be formed in a shape corresponding to the monochromatic self-luminous display panel 10. For example, when the monochromatic self-luminous display panel 10 has a square shape, the filter plate 210 may be formed in a square shape.

The plurality of circular red filters R and the plurality of circular blue filters B of the color filter 20 may be alternately disposed at a plurality of intersection points 213 where a plurality of virtual vertical lines 211 and a plurality of virtual horizontal lines 212 arranged at predetermined intervals on the filter plate 210 intersect. In addition, the plurality of circular green filters G of the color filter 20 may be disposed in the centers of a plurality of squares formed by the plurality of virtual vertical lines 211 and the plurality of virtual horizontal lines 212.

In other words, the plurality of circular red filters R and the plurality of circular blue filters B may be arranged in a matrix shape in which the circular red filters R and the circular blue filters B are alternately arranged, and the plurality of circular green filters G may be arranged between the plurality of circular red filters R and the plurality of circular blue filters B in a matrix shape. Accordingly, two circular red filters R and two circular blue filters B may be arranged around one circular green filter G, and the two circular red filters R and the two circular blue filters B may be located diagonally to each other around the circular green filter G.

The plurality of circular red filters R and the plurality of circular blue filters B may be arranged to be spaced apart from each other by a predetermined distance K. Further, the plurality of circular green filters G may be arranged so as not to interfere with the plurality of circular red filters R and the plurality of circular blue filters B. For example, two circular red filters R and two circular blue filters B may be disposed to circumscribe one circular green filter G located at the center. Alternatively, the two circular red filters R and the two circular blue filters B may be arranged to be spaced apart without contacting one circular green filter G located in the center.

The color filter 20 illustrated in FIG. 11 includes two circular red filters R, two circular blue filters B, and four circular green filters G. The two circular red filters R and the two circular blue filters B are arranged in a 2×2 matrix shape in which the circular red filters R and the circular blue filters B are alternately arranged. The four circular green filters G are arranged in a 2×2 matrix shape between the two circular red filters R and the two circular blue filters B arranged.

In other words, the two circular red filters R and the two circular blue filters B are alternately arranged at four intersection points 213 where two virtual vertical lines 211 and two virtual horizontal lines 212 spaced apart by a predetermined distance M from each other intersect. In addition, the four circular green filters G are arranged at the centers of four squares formed by three virtual vertical lines and three virtual horizontal lines. Here, the three virtual vertical lines includes the two virtual vertical lines 211 in which the two circular red filters R and the two circular blue filters B are arranged and a third virtual vertical line 211' in which the circular red filter R and the circular blue filter B are not arranged. In addition, the three virtual horizontal lines includes the two virtual horizontal lines 212 in which the two circular red filters R and the two circular blue filters B are arranged and a third virtual horizontal line 212' in which the circular red filter R and the circular blue filter B are not arranged.

On the other hand, the plurality of circular red filters R and the plurality of circular blue filters B of the color filter 20 may be provided in a number corresponding to the number of the plurality of micro LEDs 11 of the monochromatic self-luminous display panel 10. For example, the sum of the number of the plurality of circular red filters R and the number of the plurality of circular blue filters B may be equal to or greater than the number of the plurality of micro LEDs 11 of the monochromatic self-luminous display panel 10. For example, the number of the plurality of circular red filters R is the same as the number of the plurality of circular blue filters B.

In addition, the number of the plurality of circular green filters G may be the same as the number of the plurality of micro LEDs 11 of the monochromatic self-luminous display panel 10. Accordingly, the number of the plurality of circular green filters G may be the same as the sum of the number of the plurality of circular red filters R and the number of the plurality of circular blue filters B.

The color filter 20 illustrated in FIG. 11 includes two circular red filters R and two circular blue filters B. The color filter 20 also includes four circular green filters G. Accordingly, the color filter 20 illustrated in FIG. 11 may be used in the monochromatic self-luminous display panel 10 including four micro LEDs 11. The color filter 20 illustrated in FIG. 11 may be disposed above the monochromatic self-luminous display panel 10 and may be provided to move in a diagonal direction with respect to the monochromatic self-luminous display panel 10.

Hereinafter, the operation of a color filter with respect to a monochromatic self-luminous display panel will be described in detail with reference to FIG. 12.

Figure 12:
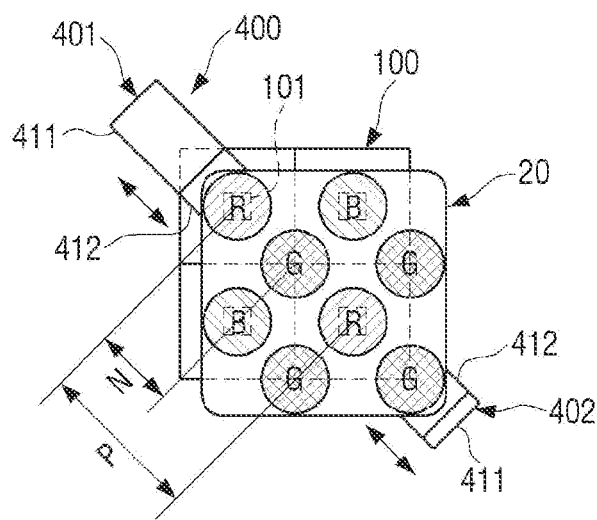
FIG. 12 is a view conceptually illustrating an example of a filter driver to drive the color filter.

FIG. 12 is a view conceptually illustrating an example of a filter driver configured to drive the color filter of FIG. 11.

As illustrated in FIG. 12, the color filter 20 may be provided to be reciprocated by a predetermined distance in a diagonal direction with respect to a monochromatic self-luminous display panel 100 by a filter driver 400. In other words, the color filter 20 may be disposed so that the filters 22 positioned above the micro LEDs 101 of the monochromatic self-luminous display panel 100 are changed by the diagonal movement of the color filter 20.

For example, the color filter 20 may be disposed so that the circular red filters R and the circular green filters G are alternately positioned above the micro LEDs 101 by the movement of the color filter 20. For example, by the movement of the color filter 20, the circular blue filters B may be also positioned above the micro LEDs 101 alternately with the circular green filters G.

To this end, the filter driver 400 may be formed to reciprocate the color filter 20 by a distance N between the center of the circular red filter R and the center of the circular green filter G. In other words, the filter driver 400 may be formed so that the color filter 20 reciprocates the distance N corresponding to ½ of the distance P between the centers of two circular red filters R adjacent in the diagonal direction. Here, the distance P between the centers of two circular red filters R adjacent in the diagonal direction is the same as a distance between the centers of two circular blue filters B adjacent in the diagonal direction and a distance between the centers of two circular green filters G adjacent in the diagonal direction.

Referring to FIG. 12, the filter driver 400 may include an upper driver 401 disposed at an upper left of the color filter 20 and a lower driver 402 disposed at a lower right of the color filter 20.

The upper driver 401 and the lower driver 402 may be disposed to face each other in the diagonal direction of the color filter 20 and may be formed to move the color filter 20 linearly in the diagonal direction. Accordingly, the color filter 20 may be linearly reciprocated in the diagonal direction of the monochromatic self-luminous display panel 100 by the upper driver 401 and the lower driver 402. The upper driver 401 and the lower driver 402 may have the same structure.

Each of the upper driver 401 and the lower driver 402 of the filter driver 400 may include a piezo actuator 411 and a connecting part 412. The piezo actuator 411 may generate a driving force capable of linearly moving the color filter 20. The connecting part 412 may be formed to connect the color filter 20 and the piezo actuator 411 so that the color filter 20 is moved linearly by the piezo actuator 411.

Accordingly, the processor 90 may control the filter driver 400 to reciprocate the color filter 20 by a predetermined distance in the diagonal direction of the monochromatic self-luminous display panel 100 above the monochromatic self-luminous display panel 100.

Hereinafter, a method in which the processor 90 controls the monochromatic self-luminous display panel 100 and the color filter 20 having the above-described structure to form full colors will be described in detail with reference to FIGS. 13A, 13B, 13C, 14A, 14B, and 14C.

Figure 13A:
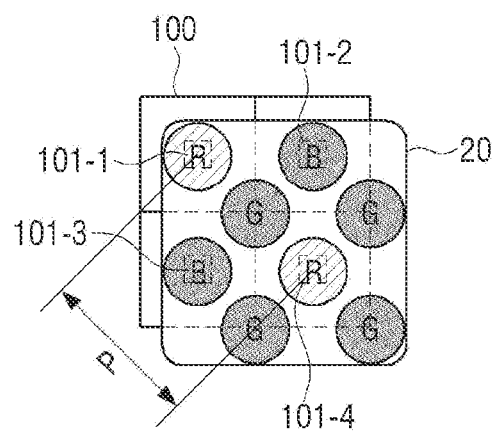
FIGS. 13A, 13B, and 13C are views for illustrating a method of generating full colors.
Figure 13B:
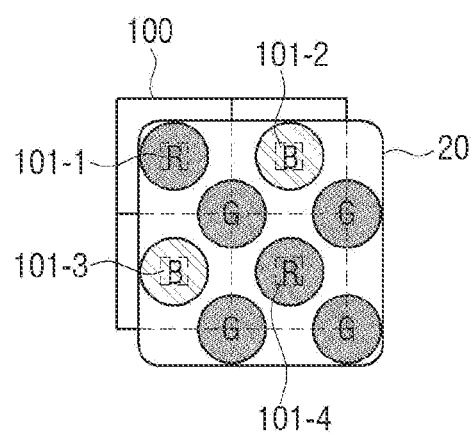
Figure 13C:
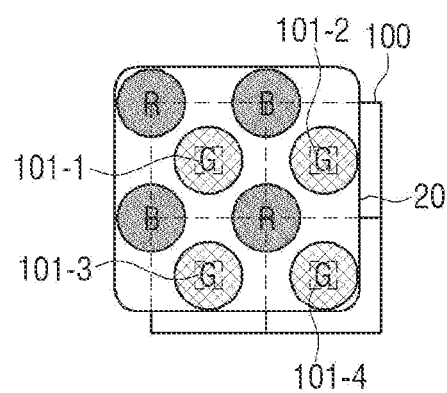

FIGS. 13A, 13B, and 13C are views for illustrating a method of generating full colors when the color filter of FIG. 11 is used in the monochromatic self-luminous display panel of FIG. 6. For reference, in FIGS. 13A, 13B, and 13C, the filter driver 400 has been removed for convenience of illustration.

The processor 90 may control the filter driver 400 so that the color filter 20 including the plurality of circular red filters R, the plurality of circular blue filters B, and the plurality of circular green filters G as illustrated in FIG. 11 reciprocates in the diagonal direction with respect to the plurality of micro LEDs 101 of the monochromatic self-luminous display panel 100.

For example, the color filter 20 may be positioned as illustrated in FIG. 13A. In detail, two circular red filters R and two circular blue filters B are respectively positioned above the corresponding micro LEDs 101. In other words, first and second circular red filters R are respectively positioned above a first micro LED 101-1 and a fourth micro LED 101-4, and first and second circular blue filters B are respectively positioned above a second micro LED 101-2 and a third micro LED 101-3. On the other hand, the four circular green filters G are not positioned above the micro LEDs 101. For example, the four micro LEDs 101 of the monochromatic self-luminous display panel 100 have a square cross-section.

In this state, when the processor 90 turns on the first and four micro LEDs 101-1 and 101-4 and turns off the second and third micro LEDs 101-2 and 101-3, white light emitted from the first and fourth micro LEDs 101-1 and 101-4 passes through the circular red filters R of the color filter 20 and becomes red light.

Next, while maintaining the position of the color filter 20 as is, the processor 90 turns off the first and four micro LEDs 101-1 and 101-4 corresponding to the two circular red filters R and turns on the second and third micro LEDs 101-2 and 101-3 corresponding to the two circular blue filters B as illustrated in FIG. 13B. Then, white light emitted from the second and third micro LEDs 101-2 and 101-3 passes through the circular blue filters B of the color filter 20 and becomes blue light.

Subsequently, the processor 90 controls the filter driver 400 to move the color filter 20 to the upper left, that is, to the upper side in the diagonal direction, by a predetermined distance, so that the four circular green filters G are respectively positioned above the micro LEDs 101, as illustrated in FIG. 13C.

For example, the processor 90 controls the filter driver 400 to move the color filter 20 from the position of FIG. 13B to the upper side of the diagonal of the monochromatic self-luminous display panel 100 by a distance corresponding to ½ of the distance P between the centers of two adjacent micro LEDs 101 in the diagonal direction. Then, all circular green filters G are positioned above the four micro LEDs 101. In this state, the processor 90 turns on the four micro LEDs 101, that is, the first, second, third, and fourth micro LEDs 101-1, 101-2, 101-3, and 101-4. Then, white light emitted from the four micro LEDs 101 passes through the circular green filters G, and thus becomes green light.

Next, the processor 90 controls the filter driver 400 to move the color filter 20 to the lower right, that is, to the lower side in the diagonal direction of the monochromatic self-luminous display panel 100 by a predetermined distance, so that all the four circular green filters G are deviated from the micro LEDs 101 and the two circular red filters R and the two circular blue filters B are positioned above the micro LEDs 101 as illustrated in FIG. 13A.

For example, the processor 90 controls the filter driver 400 to move the color filter 20 from the position of FIG. 13C to the lower side of the diagonal of the monochromatic self-luminous display panel 100 by a distance corresponding to ½ of the distance P between the centers of two adjacent micro LEDs 101 in the diagonal direction. Then, the two circular red filters R and the two circular blue filters B are positioned above the four micro LEDs 101. In this state, the processor 90 turns on the first and four micro LEDs 101-1 and 101-4 corresponding to the circular red filters R, and turn off the second and third micro LEDs 101-2 and 101-3 corresponding to the circular blue filters B. Then, white light emitted from the first and fourth micro LEDs 101-1 and 101-4 passes through the circular red filters R, and thus becomes red light.

As described above, the processor 90 controls the filter driver 400 to move the color filter 20 back and forth at a predetermined speed in the diagonal direction of the monochromatic self-luminous display panel 100, and turns on/off the plurality of micro LEDs 101 at predetermined time intervals. Then, an image emitted from the monochromatic self-luminous display panel 100 may be made into a full color image.

Figure 14A:
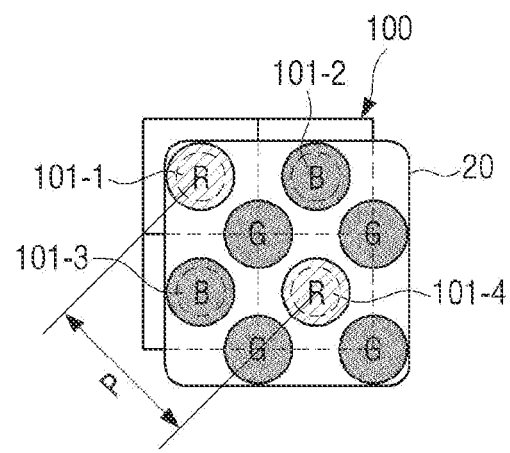
FIGS. 14A, 14B, and 14C are views for illustrating a method of generating full colors.
Figure 14B:
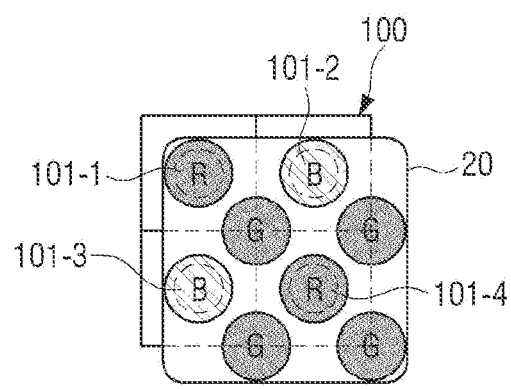
Figure 14C:
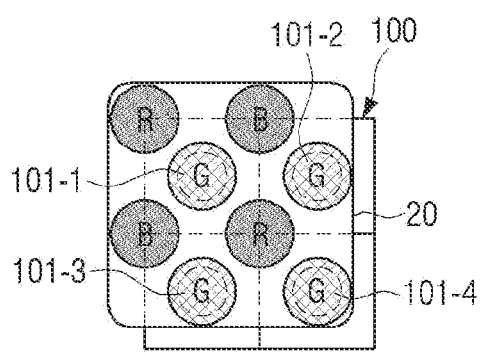

FIGS. 14A, 14B, and 14C are views for illustrating a method of generating full colors when the color filter of FIG. 11 is used in the monochromatic self-luminous display panel of FIG. 7. For reference, in FIGS. 14A, 14B, and 14C, the filter driver 400 has been removed for convenience of illustration.

The processor 90 may control the filter driver 400 so that the color filter 20 including the plurality of circular red filters R, the plurality of circular blue filters B, and the plurality of circular green filters G as illustrated in FIG. 11 reciprocates in the diagonal direction with respect to the plurality of micro LEDs 101 of the monochromatic self-luminous display panel 100.

For example, the color filter 20 may be positioned as illustrated in FIG. 14A. In detail, two circular red filters R and two circular blue filters B may be respectively positioned above the corresponding micro LEDs 101. In other words, first and second circular red filters R are respectively positioned above a first micro LED 101-1 and a fourth micro LED 101-4, and first and second circular blue filters B may be respectively positioned above a second micro LED 101-2 and a third micro LED 101-3. On the other hand, the four circular green filters G are not positioned above the micro LEDs 101.

For example, the four micro LEDs 101 of the monochromatic self-luminous display panel 100 have a circular cross-section, and the diameter d of each of the micro LEDs 101 is smaller than the distances G1 and G2 between the two adjacent micro LEDs 101 (see FIG. 7). In addition, the area of each of the circular red filters R, the circular blue filters B, and the circular green filters G is larger than the cross-sectional area of the micro LED 101.

In this state, when the processor 90 turns on the first and fourth micro LEDs 101-1 and 101-4 corresponding to the two circular red filters R and turns off the second and third micro LEDs 101-2 and 101-3 corresponding to the two circular blue filters B, white light emitted from the first and fourth micro LEDs 101-1 and 101-4 passes through the circular red filters R of the color filter 20 and becomes red light.

Next, while maintaining the position of the color filter 20 as is, the processor 90 turns off the first and fourth micro LEDs 101-1 and 101-4 corresponding to the two circular red filters R and turns on the second and third micro LEDs 101-2 and 101-3 corresponding to the two circular blue filters B as illustrated in FIG. 14B. Then, white light emitted from the second and third micro LEDs 101-2 and 101-3 passes through the circular blue filters B of the color filter 20 and becomes blue light.

Subsequently, the processor 90 controls the filter driver 400 to move the color filter 20 to the upper left, that is, to the upper side in the diagonal direction, by a predetermined distance, so that the four circular green filters G are respectively positioned above the micro LEDs 101, as illustrated in FIG. 14C.

For example, the processor 90 controls the filter driver 400 to move the color filter 20 from the position of FIG. 14B to the upper side of the diagonal of the monochromatic self-luminous display panel 100 by a distance corresponding to ½ of the distance P between the centers of two adjacent micro LEDs 101 in the diagonal direction. Then, all circular green filters G are positioned above the four micro LEDs 101. In this state, the processor 90 turns on the four micro LEDs 101, that is, the first, second, third, and four micro LEDs 101-1, 101-2, 101-3, and 101-4. Then, white light emitted from the four micro LEDs 101 passes through the circular green filters G, and thus becomes green light.

Next, the processor 90 controls the filter driver 400 to move the color filter 20 to the lower right, that is, to the lower side in the diagonal direction by a predetermined distance, so that all the four circular green filters G are deviated from the micro LEDs 101, and the two circular red filters R and the two circular blue filters B are positioned above the micro LEDs 101 as illustrated in FIG. 14A.

For example, the processor 90 controls the filter driver 400 to move the color filter 20 from the position of FIG. 14C to the lower side of the diagonal of the monochromatic self-luminous display panel 100 by a distance corresponding to ½ of the distance P between the centers of two adjacent micro LEDs 101 in the diagonal direction. Then, the two circular red filters R and the two circular blue filters B are positioned above the four micro LEDs 101 as illustrated in FIG. 14A. In this state, the processor 90 turns on the first and fourth micro LEDs 101-1 and 101-4 corresponding to the circular red filters R, and turn off the second and third micro LEDs 101-2 and 101-3 corresponding to the circular blue filters B. Then, white light emitted from the first and fourth micro LEDs 101-1 and 101-4 passes through the circular red filters R, and thus becomes red light.

As described above, the processor 90 controls the filter driver 400 to move the color filter 20 back and forth in the diagonal direction of the monochromatic self-luminous display panel 100, and individually turns on/off the plurality of micro LEDs 101 at predetermined time intervals according to the color of the corresponding filter 22. Then, an image emitted from the monochromatic self-luminous display panel 100 may be made into a full color image.

Figure 15:
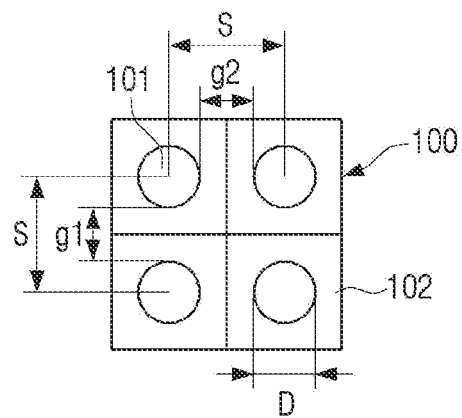
FIG. 15 is a view illustrating an example of a monochromatic self-luminous display panel used in a projector according to an embodiment.

FIG. 15 is a view illustrating an example of a monochromatic self-luminous display panel used in a projector according to an embodiment.

Referring to FIG. 15, a monochromatic self-luminous display panel 100 may include a plurality of micro LEDs 101 and a printed circuit board 102.

Each of the plurality of micro LEDs 101 may be formed to have a circular cross-section and to emit white light. The plurality of micro LEDs 101 may be disposed on the upper surface of the printed circuit board 102 and spaced apart at predetermined intervals. The plurality of micro LEDs 101 may be provided so that a distance g1 between two micro LEDs 101 adjacent in the up-and-down direction and a distance g2 between two micro LEDs 101 adjacent in the left-and-right direction are the same (g1=g2). The distances g1 and g2 between the two adjacent micro LEDs 101 may be formed smaller than the diameter D of the micro LED 101.

FIG. 15 shows a case where four micro LEDs 101 are arranged in a 2×2 matrix shape on the printed circuit board 102 for convenience of illustration and description; however, the arrangement and number of the micro LEDs 101 are not limited thereto. The plurality of micro LEDs 101 may be arranged in a 3×3 or more matrix shape.

The printed circuit board 102 may be provided with a circuit capable of supplying power to the plurality of micro LEDs 101 and controlling the on/off of each of the plurality of micro LEDs 101.

Accordingly, the monochromatic self-luminous display panel 100 illustrated in FIG. 15 is the same as the monochromatic self-luminous display panel 100 illustrated in FIG. 7.

Hereinafter, a method of generating full colors by using the color filter 20 of FIG. 11 in the monochromatic self-luminous display panel 100 of FIG. 15 will be described with reference to FIGS. 16A, 16B, and 16C.

Figure 16A:
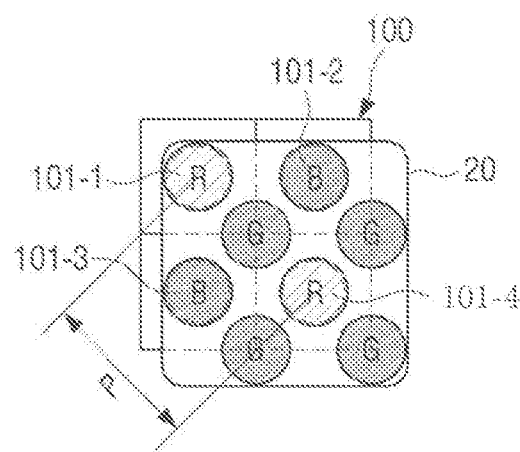
FIGS. 16A, 16B, and 16C are views for illustrating a method of generating full colors.
Figure 16B:
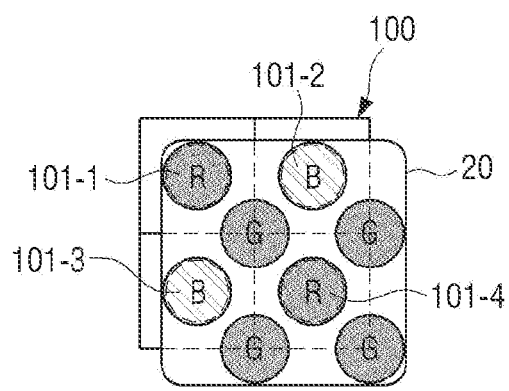
Figure 16C:
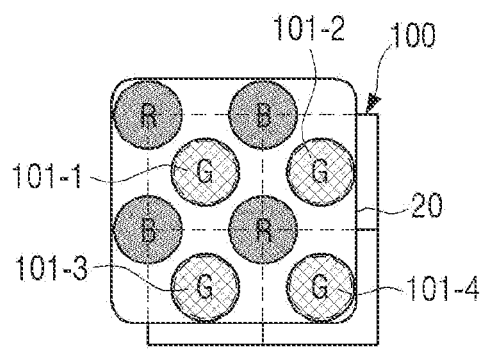

FIGS. 16A, 16B, and 16C are views for illustrating a method of generating full colors when the color filter of FIG. 11 is used in the monochromatic self-luminous display panel of FIG. 15. For reference, in FIGS. 16A, 16B, and 16C, the filter driver 400 is removed for convenience of illustration.

The processor 90 may control the filter driver 400 so that the color filter 20 including the plurality of circular red filters R, the plurality of circular blue filters B, and the plurality of circular green filters G as illustrated in FIG. 11 reciprocates in the diagonal direction with respect to the plurality of micro LEDs 101 of the monochromatic self-luminous display panel 100.

For example, the color filter 20 may be positioned at a first position as illustrated in FIG. 16A. In detail, two circular red filters R and two circular blue filters B are respectively positioned above the corresponding micro LEDs 101. In other words, first and second circular red filters R are respectively positioned above a first micro LED 101-1 and a fourth micro LED 101-4, and first and second circular blue filters B are respectively positioned above a second micro LED 101-2 and a third micro LED 101-3. On the other hand, the four circular green filters G are not positioned above the micro LEDs 101.

For example, the four micro LEDs 101 of the monochromatic self-luminous display panel 100 have a circular cross-section, and the diameter D of each of the micro LEDs 101 is larger than the distance g1 and g2 between the two adjacent micro LEDs 101 (see FIG. 15). In addition, the area of each of the circular red filters R, the circular blue filters B, and the circular green filters G is larger than the cross-sectional area of the micro LED 101.

In this state, when the processor 90 turns on the first and fourth micro LEDs 101-1 and 101-4 corresponding to the two circular red filters R and turns off the second and third micro LEDs 101-2 and 101-3 corresponding to the two circular blue filters B, white light emitted from the first and fourth micro LEDs 101-1 and 101-4 passes through the circular red filters R of the color filter 20 and becomes red light.

Next, while maintaining the first position of the color filter 20 as is, the processor 90 turns off the first and fourth micro LEDs 101-1 and 101-4 corresponding to the two circular red filters R and turns on the second and third micro LEDs 101-2 and 101-3 corresponding to the two circular blue filters B as illustrated in FIG. 16B. Then, white light emitted from the second and third micro LEDs 101-2 and 101-3 passes through the circular blue filters B of the color filter 20 and becomes blue light.

Subsequently, the processor 90 controls the filter driver 400 to move the color filter 20 to a second position, e.g., to the upper left, that is, to the upper side in the diagonal direction, by a predetermined distance, so that the four circular green filters G are respectively positioned above the micro LEDs 101, as illustrated in FIG. 16C.

For example, the processor 90 controls the filter driver 400 to move the color filter 20 from the first position of FIG. 16B to the upper side of the diagonal of the monochromatic self-luminous display panel 100 by a distance corresponding to ½ of the distance P between the centers of two adjacent micro LEDs 101 in the diagonal direction. Then, all circular green filters G are positioned above the four micro LEDs 101 as illustrated in FIG. 16C. In this state, the processor 90 turns on the four micro LEDs 101, that is, the first, second, third, and fourth micro LEDs 101-1, 101-2, 101-3, and 101-4. Then, white light emitted from the four micro LEDs 101 passes through the circular green filters G, and thus becomes green light.

Next, the processor 90 controls the filter driver 400 to move the color filter 20 to the lower right, that is, to the lower side in the diagonal direction by a predetermined distance, so that all the four circular green filters G are deviated from the micro LEDs 101, and the two circular red filters R and the two circular blue filters B are positioned above the micro LEDs 101 as illustrated in FIG. 16A.

For example, the processor 90 controls the filter driver 400 to move the color filter 20 from the second position of FIG. 16C to the lower side of the diagonal of the monochromatic self-luminous display panel 100 by a distance corresponding to ½ of the distance P between the centers of two adjacent micro LEDs 101 in the diagonal direction. Then, the two circular red filters R and the two circular blue filters B are positioned above the four micro LEDs 101 as illustrated in FIG. 16A. In this state, the processor 90 turns on the first and fourth micro LEDs 101-1 and 101-4 corresponding to the circular red filters R, and turn off the second and third micro LEDs 101-2 and 101-3 corresponding to the circular blue filters B. Then, white light emitted from the first and fourth micro LEDs 101-1 and 101-4 passes through the circular red filters R, and thus becomes red light.

As described above, the processor 90 controls the filter driver 400 to move the color filter 20 back and forth in the diagonal direction of the monochromatic self-luminous display panel 100, and individually turns on/off the plurality of micro LEDs 101 at predetermined time intervals according to the color of the corresponding filter 22. Then, an image emitted from the monochromatic self-luminous display panel 100 may be made into a full color image.

In the above description, the processor 90 controls the plurality of micro LEDs 101 of the monochromatic self-luminous display panel 100 and the filter driver 400 to sequentially convert white light emitted from the plurality of micro LEDs 101 into red light, blue light, and green light, thereby forming a full color. However, the method of controlling the plurality of micro LEDs 101 and the filter driver 400 by the processor 90 to form a full color is not limited thereto.

Hereinafter, a method of forming a full color by a processor controlling a plurality of micro LEDs and a filter driver will be described with reference to FIGS. 17A, 17B, 18A, and 18B.

Figure 17A:
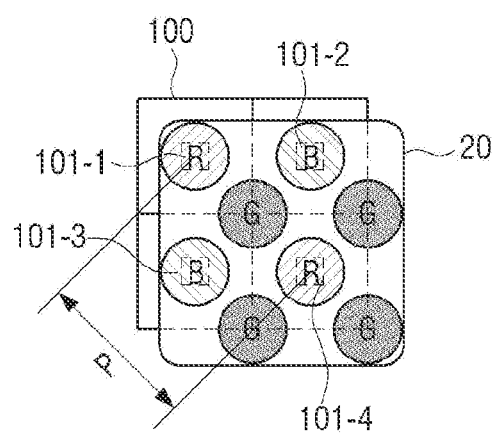
FIGS. 17A and 17B are views for illustrating a method of generating full colors.
Figure 17B:
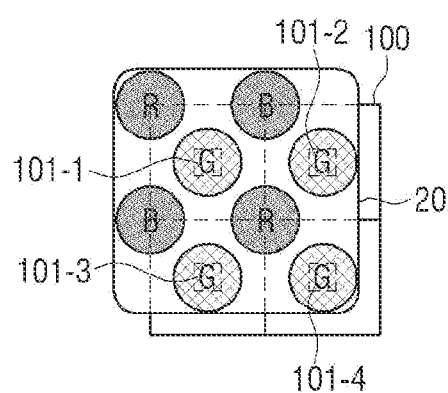

FIGS. 17A and 17B are views for illustrating a method of generating full colors when the color filter of FIG. 11 is used in the monochromatic self-luminous display panel of FIG. 6. For reference, in FIGS. 17A and 17B, the filter driver 400 is removed for convenience of illustration.

The processor 90 may control the filter driver 400 so that the color filter 20 including the plurality of circular red filters R, the plurality of circular blue filters B, and the plurality of circular green filters G as illustrated in FIG. 11 reciprocates in the diagonal direction with respect to the plurality of micro LEDs 101 of the monochromatic self-luminous display panel 100.

For example, the color filter 20 may be positioned at a first position as illustrated in FIG. 17A. In detail, two circular red filters R and two circular blue filters B are respectively positioned above the corresponding micro LEDs 101. In other words, first and second circular red filters R are respectively positioned above a first micro LED 101-1 and a fourth micro LED 101-4, and first and second circular blue filters B are respectively positioned above a second micro LED 101-2 and a third micro LED 101-3. On the other hand, the four circular green filters G are not positioned above the micro LEDs 101.

For example, the four micro LEDs 101 of the monochromatic self-luminous display panel 100 have a square cross-section, and the length of one side of the micro LED 101 is smaller than the distance G1 and G2 between the two adjacent micro LEDs 101 (see FIG. 6). In addition, the area of each of the circular red filters R, the circular blue filters B, and the circular green filters G is larger than the cross-sectional area of each of the micro LEDs 101.

In this state, the processor 90 turns on all four micro LEDs 101, that is, the first, second, third, and four micro LEDs 101-1, 101-2, 101-3, and 101-4. Then, white light emitted from the first and fourth micro LEDs 101-1 and 101-4 passes through the first and second circular red filters R and becomes red light, and white light emitted from the second and third micro LEDs 101-2 and 101-3 passes through the first and second circular blue filters B and becomes blue light. In other words, red light and blue light are simultaneously emitted from the color filter 20.

Next, the processor 90 controls the filter driver 400 to move the color filter 20 to the second position, e.g., to the upper left, that is, to the upper side in the diagonal direction, by a predetermined distance, so that the four circular green filters G are respectively positioned above the micro LEDs 101, as illustrated in FIG. 17B.

For example, the processor 90 controls the filter driver 400 to move the color filter 20 from the first position of FIG. 17A to the upper side of the diagonal of the monochromatic self-luminous display panel 100 by a distance corresponding to ½ of the distance P between the centers of two adjacent micro LEDs 101 in the diagonal direction. Then, all circular green filters G are positioned above the four micro LEDs 101 as illustrated in FIG. 17B. In this state, the processor 90 turns on the four micro LEDs 101, that is, the first, second, third, and four micro LEDs 101-1, 101-2, 101-3, and 101-4. Then, white light emitted from the four micro LEDs 101 passes through the circular green filters G, and thus becomes green light.

Next, the processor 90 controls the filter driver 400 to move the color filter 20 to the first position, e.g., to the lower right, that is, to the lower side in the diagonal direction by a predetermined distance, so that all the four circular green filters G are deviated from the micro LEDs 101 and the two circular red filters R and the two circular blue filters B are positioned above the micro LEDs 101 as illustrated in FIG. 17A.

For example, the processor 90 controls the filter driver 400 to move the color filter 20 from the second position of FIG. 17B to the lower side of the diagonal of the monochromatic self-luminous display panel 100 by a distance corresponding to ½ of the distance P between the centers of two adjacent micro LEDs 101 in the diagonal direction. Then, the two circular red filters R and the two circular blue filters B are positioned above the four micro LEDs 101. In this state, the processor 90 turns on all the first, second, third, and four micro LEDs 101-1, 101-2, 101-3, and 101-4. Then, white light emitted from the first and fourth micro LEDs 101-1 and 101-4 passes through the first and second circular red filters R and becomes red light, and white light emitted from the second and third micro LEDs 101-2 and 101-3 passes through the first and second circular blue filters B and becomes blue light.

As described above, the processor 90 controls the filter driver 400 to reciprocate the color filter 20 in the diagonal direction of the monochromatic self-luminous display panel 100 at a predetermined speed, and maintains the plurality of micro LEDs 101 in an on state. Then, because the red light and blue light that are simultaneously emitted from the color filter 20 and the green light are alternately emitted from the color filter 20, an image emitted from the monochromatic self-luminous display panel 100 may be made into a full color image.

Figure 18A:
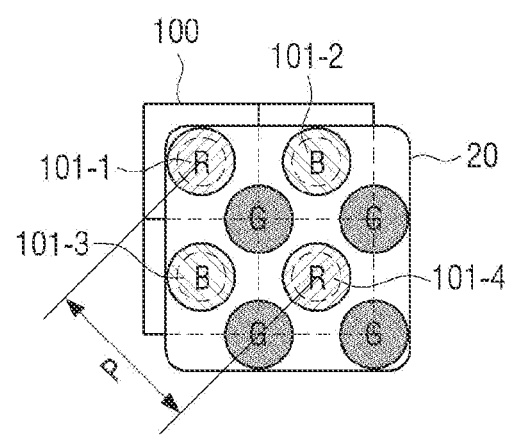
FIGS. 18A and 18B are views for illustrating a method of generating full colors.
Figure 18B:
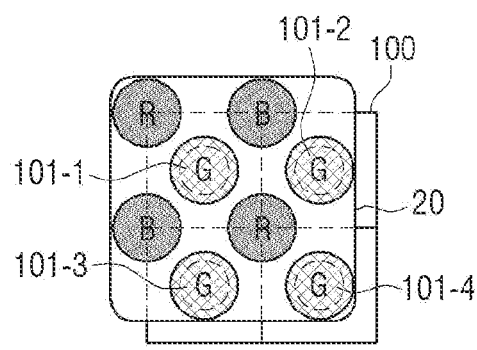

FIGS. 18A and 18B are views for illustrating a method of generating full colors when the color filter of FIG. 11 is used in the monochromatic self-luminous display panel of FIG. 7. For reference, in FIGS. 18A and 18B, the filter driver 400 is removed for convenience of illustration.

The processor 90 may control the filter driver 400 so that the color filter 20 including the plurality of circular red filters R, the plurality of circular blue filters B, and the plurality of circular green filters G as illustrated in FIG. 11 reciprocates in the diagonal direction with respect to the plurality of micro LEDs 101 of the monochromatic self-luminous display panel 100.

For example, the color filter 20 may be positioned at the first position as illustrated in FIG. 18A. In detail, two circular red filters R and two circular blue filters B are respectively positioned above the corresponding micro LEDs 101. In other words, first and second circular red filters R are respectively positioned above a first micro LED 101-1 and a fourth micro LED 101-4, and first and second circular blue filters B are respectively positioned above a second micro LED 101-2 and a third micro LED 101-3. On the other hand, the four circular green filters G are not positioned above the micro LEDs 101.

For example, the four micro LEDs 101 of the monochromatic self-luminous display panel 100 have a circular cross-section, and the diameter d of the micro LED 101 is smaller than the distance G1 and G2 between the two adjacent micro LEDs 101 (see FIG. 7). In addition, the area of each of the circular red filters R, the circular blue filters B, and the circular green filters G is larger than the cross-sectional area of each of the micro LEDs 101.

In this state, the processor 90 turns on all four micro LEDs 101, that is, the first, second, third, and four micro LEDs 101-1, 101-2, 101-3, and 101-4. Then, white light emitted from the first and fourth micro LEDs 101-1 and 101-4 passes through the first and second circular red filters R and becomes red light, and white light emitted from the second and third micro LEDs 101-2 and 101-3 passes through the first and second circular blue filters B and becomes blue light. In other words, red light and blue light are simultaneously emitted from the color filter 20.

Next, the processor 90 controls the filter driver 400 to move the color filter 20 to the second position, e.g., to the upper left, that is, to the upper side in the diagonal direction, by a predetermined distance, so that the four circular green filters G are respectively positioned above the micro LEDs 101, as illustrated in FIG. 18B.

For example, the processor 90 controls the filter driver 400 to move the color filter 20 from the position of FIG. 18A to the upper side of the diagonal of the monochromatic self-luminous display panel 100 by a distance corresponding to ½ of the distance P between the centers of two adjacent micro LEDs 101 in the diagonal direction. Then, all circular green filters G are positioned above the four micro LEDs 101 as illustrated in FIG. 18B. In this state, the processor 90 turns on all the four micro LEDs 101, that is, the first, second, third, and four micro LEDs 101-1, 101-2, 101-3, and 101-4. Then, white light emitted from the four micro LEDs 101 passes through the circular green filters G, and thus becomes green light.

Next, the processor 90 controls the filter driver 400 to move the color filter 20 to the first position, e.g., the lower right, that is, to the lower side in the diagonal direction by a predetermined distance, so that all the four circular green filters G are deviated from the micro LEDs 101 and the two circular red filters R and the two circular blue filters B are respectively positioned above the micro LEDs 101 as illustrated in FIG. 18A.

For example, the processor 90 controls the filter driver 400 to move the color filter 20 from the position of FIG. 18B to the lower side of the diagonal of the monochromatic self-luminous display panel 100 by a distance corresponding to ½ of the distance P between the centers of two adjacent micro LEDs 101 in the diagonal direction. Then, the two circular red filters R and the two circular blue filters B are positioned above the four micro LEDs 101. In this state, the processor 90 turns on all the first, second, third, and fourth micro LEDs 101-1, 101-2, 101-3, and 101-4. Then, white light emitted from the first and fourth micro LEDs 101-1 and 101-4 passes through the first and second circular red filters R and becomes red light, and white light emitted from the second and third micro LEDs 101-2 and 101-3 passes through the first and second circular blue filters B and becomes blue light.

As described above, the processor 90 controls the filter driver 400 to move the color filter 20 back and forth in the diagonal direction of the monochromatic self-luminous display panel 100 at a predetermined speed, and maintains the plurality of micro LEDs 101 in an on state. Then, because the red light and blue light that are simultaneously emitted from the color filter 20 and the green light are alternately emitted from the color filter 20 at predetermined time intervals, an image emitted from the monochromatic self-luminous display panel 100 may be made into a full color image.

The projector according to an embodiment having the above-described structure may improve brightness efficiency by about four times as compared to a related art LCD projector using transmissive LCDs.

In addition, the projector according to an embodiment has a simple structure, and thus may be reduced in size as compared to a LCD projector or a DLP projector according to the related art. For example, the overall dimension of the projector excluding the projection lens may be reduced by at least 90% as compared to the overall dimension of the projector according to the related art.

In addition, the projector according to an embodiment uses only one monochromatic self-luminous display panel and does not use a prism and a mirror; therefore, a manufacturing cost may be lower as compared to a manufacturing cost of a projector of the related art.

While certain embodiments have been particularly shown and described with reference to the drawings, embodiments are provided for the purposes of illustration and it will be understood by one of ordinary skill in the art that various modifications and equivalent other embodiments may be made from the disclosure. Accordingly, the true technical scope of the disclosure is defined by the technical spirit of the appended claims.

What is claimed is:
1. A projector comprising:
a monochromatic self-luminous display panel;
a color filter disposed in front of the monochromatic self-luminous display panel;
a filter driver configured to move the color filter in a direction parallel to the monochromatic self-luminous display panel;
a micro lens array disposed in front of or behind the color filter and configured to convert light emitted from the monochromatic self-luminous display panel into parallel light;
a projection lens disposed in front of the micro lens array and the color filter and configured to project light that has passed through the micro lens array and the color filter onto a screen; and
a processor configured to control the monochromatic self-luminous display panel and the filter driver.

2. The projector as claimed in claim 1, wherein the monochromatic self-luminous display panel comprises a plurality of micro light emitting diodes (LEDs).

3. The projector as claimed in claim 2, wherein each of the plurality of micro LEDs has a square cross-section or a circular cross-section, and the plurality of micro LEDS are spaced apart at predetermined intervals,
wherein, based on the plurality of micro LEDs having the square cross-section, a distance between adjacent micro LEDs of the plurality of micro LEDs is greater than a length of one side of each of the plurality of micro LEDs, and
wherein, based on the plurality of micro LEDs having the circular cross-section, the distance between the adjacent micro LEDs of the plurality of micro LEDs is greater than a diameter of each of the plurality of micro LEDs.

4. The projector as claimed in claim 3, wherein the color filter includes a plurality of filter cells arranged in a checkerboard pattern,
wherein each of the plurality of filter cells includes four filters arranged in a 2×2 matrix, and
wherein the four filters include a red filter R, a green filter G, a blue filter B, and a green filter G arranged in this order in a clockwise direction.

5. The projector as claimed in claim 4, wherein the plurality of filter cells respectively correspond to the plurality of micro LEDs in a one-to-one relationship.

6. The projector as claimed in claim 4, wherein the processor is further configured to control the filter driver to move the color filter to circulate the four filters of each of the plurality of filter cells that correspond to each of the plurality of micro LEDs along one path with respect to each of the plurality of micro LEDs, respectively.

7. The projector as claimed in claim 6, wherein the processor is further configured to move the color filter to circulate the four filters of each of the plurality of filter cells in an order of the red filter R, the green filter G, the blue filter B, and the green filter G.

8. The projector as claimed in claim 4, wherein the filter driver is further configured to move the color filter in an up-and-down direction and in a left-and-right direction.

9. The projector as claimed in claim 8, wherein the filter driver includes:
an up-and-down filter driver configured to move the color filter in the up-and-down direction; and
a left-and-right filter driver configured to move the color filter in the left-and-right direction.

10. The projector as claimed in claim 9, wherein each of the up-and-down filter driver and the left-and-right filter driver includes:
a piezo actuator configured to move the color filter in one direction; and
a coupler configured to selectively connect or separate the color filter and the piezo actuator.

11. The projector as claimed in claim 3, wherein the color filter includes a plurality of red filters R, a plurality of blue filters B, and a plurality of green filters G,
   wherein the plurality of red filters R and the plurality of blue filters B are alternately disposed at a plurality of intersection points where a plurality of virtual vertical lines and a plurality of virtual horizontal lines arranged at predetermined intervals intersect, and
   wherein the plurality of green filters G are disposed at centers of a plurality of squares, respectively, that are formed by the plurality of virtual vertical lines and the plurality of virtual horizontal lines.

12. The projector as claimed in claim 11, wherein two red filters R of the plurality of red filters R and two blue filters B of the plurality of blue filters B are circumscribed to one green filter G of the plurality of green filters G.

13. The projector as claimed in claim 11, wherein a sum of a number of the plurality of red filters R and a number of the plurality of blue filters B is equal to a number of the plurality of micro LEDs.

14. The projector as claimed in claim 11, wherein the processor is further configured to control the filter driver to reciprocate the color filter by a predetermined distance in a diagonal direction of the monochromatic self-luminous display panel.

15. The projector as claimed in claim 14, wherein the filter driver is configured to reciprocate the color filter by the predetermined distance between a center of a red filter R, among the plurality of red filters R, and a center of a green filter G, among the plurality of green filters G, that are disposed diagonally adjacent to each other.

16. The projector as claimed in claim 14, wherein the processor is further configured to control to output a red light by moving the color filter to a first position at which the plurality of red filters R are positioned above first micro LEDs and the plurality of blue filters B are positioned above second micro LEDs, among the plurality of micro LEDs, and turning on the first micro LEDs corresponding to the plurality of red filters R while the second micro LEDs are off.

17. The projector as claimed in claim 16, wherein the processor is further configured to control to output a blue light by turning off the first micro LEDs corresponding to the plurality of red filters R, and turning on the second micro LEDs corresponding to the plurality of blue filters B while maintaining the first position of the color filter.

18. The projector as claimed in claim 17, wherein the processor is further configured to control to output a green light by moving the color filter to a second position at which the plurality of green filters G are positioned above all of the plurality of micro LEDs, respectively, and turning on all of the plurality of micro LEDs.

19. The projector as claimed in claim 2, wherein each of the plurality of micro LEDs has a circular cross-section and the plurality of micro LEDs are spaced apart at predetermined intervals, and
   wherein a distance between adjacent micro LEDs of the plurality of micro LEDs is smaller than a diameter of each of the plurality of micro LEDs.

20. The projector as claimed in claim 11, wherein the plurality of red filters R, the plurality of blue filters B, and the plurality of green filters G are circular filters.

* * * * *